United States Patent [19]

Wilheim

[11] 4,264,544
[45] Apr. 28, 1981

[54] METHOD OF MOLDING A RIGID INTEGRAL SKIN FOAMED RESIN PRODUCT IN A MOLD HAVING A VENTED LID

[75] Inventor: Martin J. Wilheim, New York, N.Y.

[73] Assignee: The Unisource Corporation, Philadelphia, Pa.

[21] Appl. No.: 728,969

[22] Filed: Oct. 4, 1976

Related U.S. Application Data

[60] Continuation of Ser. No. 402,819, Oct. 2, 1973, abandoned, which is a division of Ser. No. 101,823, Dec. 12, 1970, abandoned.

[51] Int. Cl.³ ............................................. B29D 27/04
[52] U.S. Cl. ................................... 264/45.5; 264/51; 264/331; 264/338; 425/812; 425/817 R
[58] Field of Search ............... 264/46.4, 46.5, 46.6, 264/54, 45.5, 338, 51, 331; 425/812, 817 R

[56] References Cited

U.S. PATENT DOCUMENTS

| | | | |
|---|---|---|---|
| 3,493,449 | 2/1970 | Krug | 264/46.4 X |
| 3,533,899 | 10/1970 | Kapral | 428/40 |
| 3,844,523 | 10/1974 | Wilheim | 264/45.5 X |
| 3,890,418 | 6/1975 | Raczek | 264/54 |
| 3,895,154 | 2/1975 | Kapral | 264/51 X |
| 3,976,731 | 8/1976 | Kapral | 264/46.4 |
| 4,035,458 | 7/1977 | Lyman | 264/46.4 |
| 4,138,283 | 2/1979 | Hanusa | 264/46.4 X |

FOREIGN PATENT DOCUMENTS 1000566  8/1965  United Kingdom .................. 264/46.5

OTHER PUBLICATIONS

Pelesko, J. D. "RCI Furniture Seminar, Elizabeth, N.J.", White Plains, N.Y., Reichhold Chemicals, Inc., Apr. 7, 1970, 11 pages.
Reichhold (RCI) Application Bulletin, "Polylite Polyurethane Resin: Production & Trouble Shooting Guide for Molded Rigid Polyurethane Foam Furniture Components", White Plains, N.Y., Reichhold Chemicals, Inc., (1/70), 8 pages.

*Primary Examiner*—Philip Anderson
*Attorney, Agent, or Firm*—Weingarten, Maxham & Schurgin

[57] ABSTRACT

Mold, particularly for rigid polyurethane foam articles having finished textured surfaces on all sides thereof comprising a female mold having a recess into which the unreacted and unblown resin system is deposited and a cover for closing the mold together with a release sheet structure disposed therebetween exhibiting sufficient gas porosity to enable complete venting of air displaced by the rising foam in the production of a finished surface thereat and method of molding therewith.

16 Claims, 3 Drawing Figures

METHOD OF MOLDING A RIGID INTEGRAL SKIN FOAMED RESIN PRODUCT IN A MOLD HAVING A VENTED LID

This is a continuation of application Ser. No. 402,819, filed Oct. 2, 1973 which in turn is a division of application Ser. No. 101,823, filed Dec. 12, 1970, and now both abandoned.

This invention relates to methods for molding foamable materials.

It is a primary object of the present invention to provide methods for molding foamable materials so as to produce finished surfaces on all sides thereof.

Another primary object of the present invention, in addition to the foregoing object, is to provide such methods wherein the surfaces produced may be selectively smooth, textured, and/or printed or colored.

Another primary object of the present invention, in addition to each of the foregoing objects, is the provision of such methods wherein the resultant products simulate hand-carved wood or other surfaces or materials.

Yet another primary object of the present invention, in addition to each of the foregoing objects, is the provision of such methods for molding, particularly rigid urethane foams.

Yet still another primary object of the present invention, in addition to each of the foregoing objects, is the provision of methods for molding of foams within a cavity having means of sufficient gas porosity for venting to enable the foam to fully fill the cavity while preventing the exudation of the foam material therefrom.

Yet still further, is is another primary object of the present invention, in addition to each of the foregoing objects, to provide methods for molding of foams within molds comprising a cavity and a cover therefor together with a sheet of material having one or more layers beneath the cover non-adherent to the foam and of sufficient gas porosity to vent the cavity during foaming so that the foam may fully and completely fill the cavity and produce a finished and/or hard-skinned, smooth or textured but void or bubble-free surface against the cover.

Another primary object of the present invention, in addition to each of the foregoing objects is the provision of reusable breathable release papers for molding urethane foams and the like which are non-adherent to the foam and which may produce a finished surface thereto free of voids or defects and which may be hardskinned and selectively smooth or textured and/or printed with a desired pattern.

Another and yet still further primary object of the present invention, in addition to each of the foregoing objects, is the provision of such methods wherein the release structure comprises a smooth, creped or embossed paper backing sheet coated or impregnated with a release material for contact with the form.

Still another and yet further primary object of the present invention, in addition to each of the foregoing objects, is the provision of such methods wherein the release material comprises quilon, aqueous silicone solution or a multi-layered structure such as a layer of a plastic; for example, a polyolefin such as polyethylene or a vinyl resin such as polyvinyl acetate coated with a layer of quilon or silicone such as dimethylpolysiloxane.

A still further primary object of the present invention in addition to each of the foregoing objects, is the provision in a mold for rigid urethane foams, of a creped paper sheet having sufficient gas porosity to enable complete venting of the mold chamber during foaming while precluding exudation of the foam and covered with a release material for disposing beneath the mold cover and the formation of molded articles finished on all sides.

Yet still another primary object of the present invention, in addition to each of the foregoing objects, is the provision of novel methods for the molding of rigid urethane foams to simulate wood or other desired material and which are economic and reliable in use.

Yet another and still further primary object of the present invention, in addition to each of the foregoing objects, is the provision of breathable, reusable release papers over-printed with a transferable pattern for transfer to the surface of the plastic molded thereagainst to provide a finished surface thereto.

Yet still another and yet further primary object of the present invention, in addition to each of the foregoing objects, is the provision of breathable, reusable release papers against which urethane foam may be molded to produce a fully finished surface thereto.

The invention resides in the combination, construction, arrangement and disposition of the various component parts and elements incorporated in improved molds constructed in accordance with the principles of this invention and in methods of molding therewith. The present invention will be better understood and objects and important features other than those specifically enumerated above will become apparent when consideration is given to the following details and description, which when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

IN THE DRAWING

For convenience of reference the same structural elements are given the same reference numerals throughout the drawings.

Figure 1:
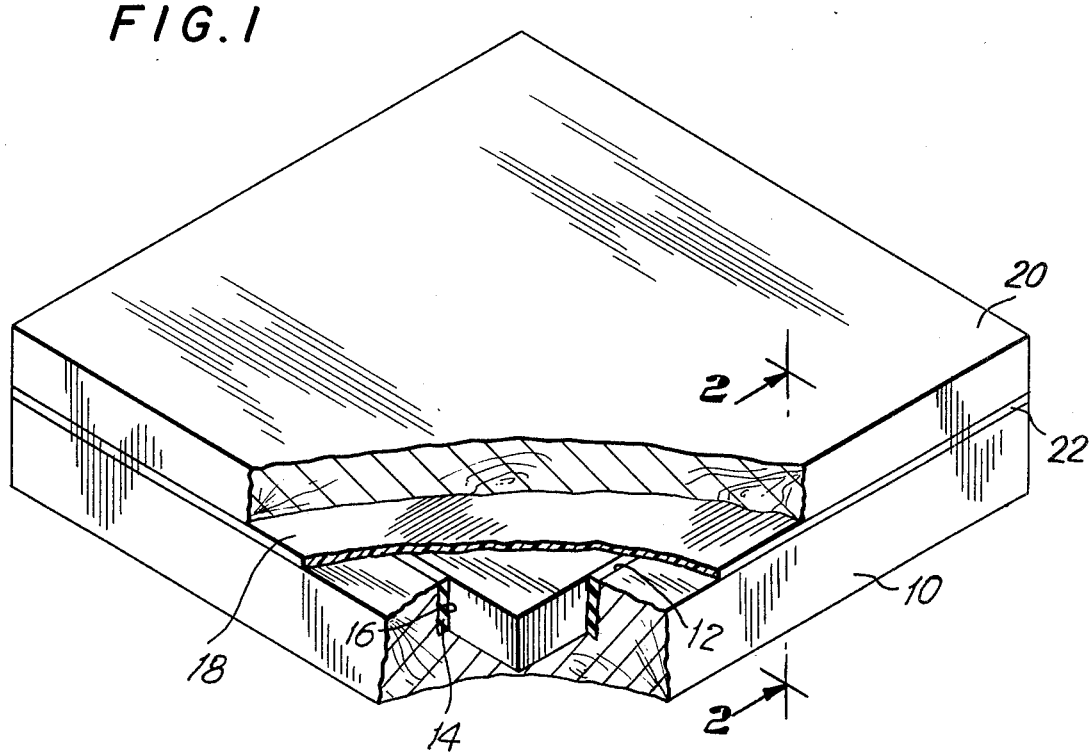
FIG. 1 is a diagramatic perspective illustration of an exemplary mold and article formed therein in accordance with the present invention and FIG. 2 is a cross-sectional elevational enlarged view of a portion thereof.

Polyurethane foams are now in widespread use by furniture manufacturers, contract molders, etc., to cast mold such products as picture frames, plaques, wooden beams for ceilings, moldings for mirrors, statues, furniture parts and trim, simulated carvings, clock housings and many other ornate or finely detailed products. Rigid urethane foam, when poured into a female mold cavity made to the exact configuration of the desired part, faithfully reproduces the contours of that mold part and cures to form a toughskinned piece which can be finished and worked just like wood. Texture and grain patterns can be reproduced on the surface and deep undercuts can be molded into the piece for added authenticity.

The mold may be made from a master which can be an original piece especially created by a skilled artisan in wood or metal, or the master can be the exact item that is required for reproduction in dense foam. Such molds may be made of liquid latex, silicone rubbers, castable urethanes, elastomers, etc. Various techniques have been developed for mold making.

Once the mold has been produced, the following steps are customary to make a foam molded part.

1. A release agent and/or a barrier coat may be sprayed over the entire surface of the mold prior to molding each piece. These enable the foam molded part to be easily removed from the mold. The barrier coat, which is normally pigmented, adheres to the form and becomes a continuous outer surface of the foam part, serving to cover up tiny blisters which might be encountered if the foam were bare. The barrier coat may also serve as a base tonal coat for subsequent finishing. Since the foamed pieces may later be finished or stained the release agent should be either paintable or adapted to be easily removed.

2. A predetermined amount of material from which the foam is generated may then be distributed in the mold. This material or foam system is generally created by blending two liquid components at the time of deposition in the mold which react chemically to provide a self-foaming, self-curing composition. The foam system formula may vary dependent upon the characteristics required in the finished part. Only a portion of the mold is generally filled with the unblown system with the self-rise or blowing characteristics of the foam being utilized to expand the system to completely fill the mold.

3. A cover or lid of a rigid material then has a release material applied to its lower surface and it is then laid or placed on top of the mold cavity, either mechanically or hydraulically on the mold so as to close the cavity and confine the foam during its rise.

4. About 30 to 60 seconds after the foam is poured into the mold, it begins to "cream" or begin its foaming action. Then the foam begins its rise to fill the cavity of the mold.

5. The foam need only remain in the mold a total, for example, of 8 to 15 minutes until it completes its cream and rise stages and has at least initially cured. Then the lid is removed and the cured part is demolded. If the part is removed after only, for example, 8 to 15 minutes, the cure is not complete and the part is somewhat flexible, enabling it to be more readily demolded.

6. The molded part is then stained, lacquered, or otherwise finished by means conventional to wood finishes.

As indicated above, the foam material deposited in the mold should be carefully metered in an amount which only partially fills the mold to enable the material to rise and expand to completely fill the mold during foaming. The air which is displaced by the rising foam must be vented outwardly of the closed mold and must escape freely or else it will interfere with proper filling of the mold since if any air is entrapped, it will result in defects, such as bubbles, air pockets, or the like, in the finished part. The component parts of the mold itself, including the mold and the lid or backplate are generally impermeable. Where a finished 6th side, that is, the side cast against the lid or backplate is not required, then the lid or backplate can be loosely clamped to the mold and air vented around the periphery. Any exudation of foam into the gap and any air bubbles trapped between the rising foam and the lid or backplate can all be ground off or cut in a flash removal step. Where, however, it is desired that the molded article be finished on all sides, then specific venting means must be provided.

Figure 2:
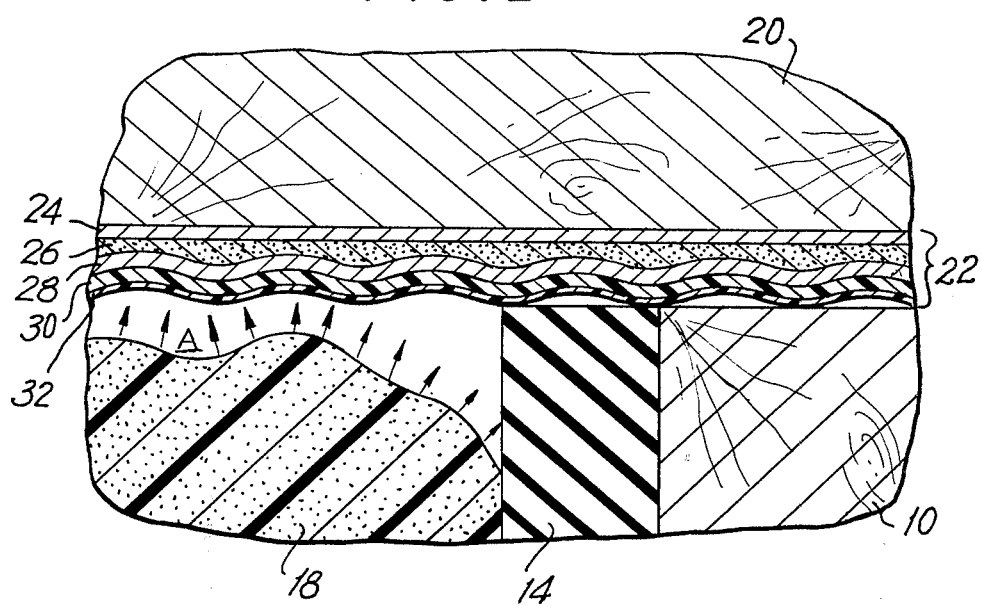

Moreover, since the foam rises generally upwardly and outwardly, but not entirely evenly, it is important that the venting occur substantially entirely across the inner surface of the lid or backplate and venting around the periphery is not sufficient since during the rise or foaming, small pockets of gas, such as indicated at "A" in FIG. 2 might be trapped to form a bubble or defect in the surface.

Accordingly, in accordance with the present invention, there is provided a layer of material positioned beneath the lid or backplate of the mold having sufficient gas porosity to enable proper venting without exudation of foam and which is rendered non-adherent to the foam.

With particular reference to the drawing, there is shown and illustrated a mold box 10 having a cavity 12 therein having a mold liner 14 disposed therein defining a mold cavity 16 within which a foamed plastic part 18 may be cast. The mold box 10 is provided with a rigid lid or backplate 20 which may be clamped thereto by substantially any desired clamp, mechanical, hydraulic, or the like, to resist the rising foam. Disposed beneath the lid or backplate 20 there may be provided a layered structure 22 which provides the desired characteristics of gas porosity without permitting exudation of the foam material and which is non-adherent thereto. The layered structure 22 may further, as hereinafter pointed out, provide a desired texture or printing, or flat smooth finish to the adjacent surface of the molded article 18.

Moreover, the layered structure 22, in addition to its "breathing" or gas porosity characteristics, should have sufficient rigidity so as not to "sag" into the mold cavity. If the layered structure 22 is not sufficiently rigid so that it does sag into the mold cavity, the foam during its rise may pinch the paper, as in the region "A" of FIG. 2. Yet still further, the surface of the layered structure 22 against which the foam 18 is cast preferably should produce self-skinning or hard surfacing to the resultant article and, preferably, should be capable of texturing the finished article and be re-usable and may be capable of transferring a printed image thereto.

A suitable layered structure 22 for use in the present invention may comprise a creped backing sheet such as paper 28 coated with a release material on the side in contact with the urethane. The release material may comprise a layer of a polyolefin 30, such as polyethylene or a vinyl resin such as polyvinyl acetate coated with a silicone coating 32 such as dimethylpolysiloxane. The release material preferably conforms to the surface of the creped backing sheet to provide a crepe surface coated with silicone in contact with the foam 18.

The creped backing sheet 28 may be laminated to a support layer 24 which may comprise, for example, calendered paper by means of glue 26 or other suitable adhesive.

The release material may, as pointed out above, comprise polyethylene coated with a silicone but polyethylene alone or silicone alone may also be suitable. However, for maximum effectiveness and economy, the polyethylene-silicone layered structure has been found advantageous since silicone alone is relatively expensive and too easily absorbed by the backing layer but does aid in providing the desired release characteristics.

The backing sheet may be coated with the release paper and then creped, wrinkled, embossed, printed or the like in the drying state to any desired texture and configuration. For example, the coated backing sheet may be embossed to provide a wood grain pattern. The backing material is preferably crepe to 10–15% contraction. However, contraction as high as 50% may be used.

Preferably, the backing paper of basic weight of 1–80 lbs. per ream is suitable coated with 1–10 lbs. polyethylene per ream overcoated with 0.01–2 lbs. of cured dimethylpolysiloxane solids per ream, then creped or embossed to contract not more than 50% of its original width. The backing layer 28 may comprise glassine or clay-filled highly calendered Kraft paper.

The layered structure or breathing paper 22, therefore, preferably has the following characteristics:

1. It has the proper "breathing" characteristics. It has the right amount of porosity to adequately vent the air from the mold without allowing the foam to bleed through it.

2. It is release treated enabling the paper to be easily peeled off the cured part. The release treatment does not "migrate" to the foam.

3. As a creped "embossing" which simulates a wood-grained appearance. This embossed surface of the paper imparts the same texture to the foam which is molded against it and this embossed outer surface of the part has the desired tough skin.

4. It is rigid enough and therefore does not "sag" into the mold causing creases.

5. It is suitable for multiple use, i.e., each sheet can be used for three and more moldings and therefore eliminates extra costs in handling and disposal.

Utilizing the present invention, foam parts having all surfaces attractively finished may be produced. Such completely finished or 6-sided parts may be used, for example, as a cabinet door with the whole door molded of foam with the back side being free of warp, free of air pockets and having a wood-grain embossing to give it a finished look complementing the other five sides. Even if the sixth side need not be finished for the particular usage to be made, the elimination of any necessity for trim or other finishing steps provides worthwhile savings even where only five-sided parts are required.

The mold liner 14 may comprise any of a number of wall-elastomer, or the like, or the molds may comprise rigid materials such as metal. Additionally, an appropriate mold release, such as a lacquer, an emulsifiable wax or thermoplastic film may be applied to the mold. The support layer 24 may comprise a card stock, chip board, cardboard, or substantially any desired material having the requisite rigidity to prevent sag.

In the foregoing specification and the subjoined claims by reference to layered structure, it is specifically intended that such reference include structure having at least one layer. For example, breathable release papers in accordance with the present invention may comprise a first layer laminated to a heavier backing layer or, if such first layer is of sufficient rigidity or thickness to preclude buckling into the mold cavity and thereby preclude the formation of wrinkles therein during creaming or rise of the foam material, the backing layer may be dispensed with.

Moreover, the release material may be applied directly to the support layer, rather than be coated on an intermediate plastic layer. For such direct coating, quilon or silicone solutions may be utilized, for example. Yet further, although urethane foam systems are highly sensitive to moisture, since water reacts therewith to produce carbon dioxide which may result in voids or pockets formed, an aqueous silicone solution may be used to treat the support layer since the moisture would be sufficiently driven off and eliminated during drying.

Figure 3:
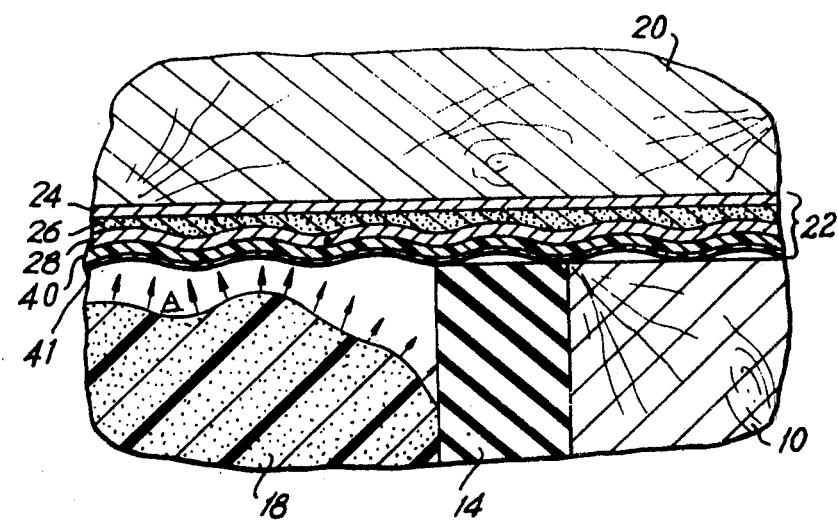
FIG. 3 is a cross sectional elevational enlarged view of an alternative embodiment of the invention additionally including a transferable printed pattern.

Finally, as heretofore pointed out, the barrier coat may be pigmented. Where a variegated or multi-hard finish is desired on the foamed part, the barrier coat may be pigmented to the background or ground color of the desired finish and, as shown in FIG. 3, the release paper or structure may have printed thereon, for example, over the release layer 40, a pattern or other desired ornamentation layer 41 which, upon rise of the foam system, will adhere and be transferred thereto from the release layer. Release papers in accordance with the present invention may even be used as a form to enable foaming in place of urethane foam if desired to form finished wall panels, etc.

In the foregoing specification and the ensuing claims, quilon refer to a chrome complex such as that marketed by DuPont.

While the invention has been described, disclosed, illustrated and shown in terms of an embodiment or modification which it has assumed in practice, the scope of the invention should not be deemed to be limited by the precise embodiment or modification herein described, disclosed, illustrated or shown, such other embodiments or modifications as may be suggested to those having the benefit of the teachings herein being intended to be reserved especially as they fall within the scope and breadth of the claims here appended.

What is claimed is:

1. In the method of molding a rigid foam plastic article using a mold box having an apertured molding cavity therein and a lid for covering said aperture and characterized by the steps of (1) depositing foamable plastic material in said molding cavity; (2) covering said cavity with said lid; (3) permitting said foamable plastic to foam and expand into contact with the walls of said molding cavity; and (4) demolding the resulting molded foam plastic article, the improvement comprising the steps of:

disposing between said lid and said mold box, covering said cavity, a breathable layered structure consisting essentially of breathable paper laminated to a support sheet for providing support against sagging, said paper having a textured, release-treated surface positioned for contacting said foamable plastic when said plastic foams and expands, said layered structure exhibiting sufficient gas porosity to enable substantially complete venting of the mold cavity through said layered structure outwardly between the mold box and the lid during foaming of plastic material deposited therein while precluding exudation of such material therethrough;

molding the surface of said foam plastic article beneath said breathable layered structure to provide a hard-skinned, textured, finished outer surface substantially free of visible wrinkles, gas pockets, or bubbles by (a) supporting said paper against sagging into said mold cavity; (b) permitting said foamable plastic to foam and expand into intimate molding contact with said release-treated surface; and (c) venting entrapped gas laterally through said breathable layered structure out of the mold between said lid and said mold; and peeling said breathable layered structure from said molded plastic article thereby exposing said hard-skinned, finished outer surface.

2. The method according to claim 1 including the step of clamping said breathable layered structure between said lid and said mold box in order to reduce exudation of foam plastic from said mold.

3. The method according to claim 1 wherein said textured release-treated paper surface comprises a surface textured by creping.

4. The method according to claim 1 wherein said textured release-treated paper surface comprises a surface textured to simulate wood grain.

5. The method according to claim 1 wherein:

said breathable layered structure comprises a layer of creped paper with a release-treated creped surface laminated to a support sheet for providing support against sagging.

6. The method according to claim 5 wherein said textured release-treated paper surface comprises a surface creped to contraction of not more than 50 percent.

7. The method according to claim 5 wherein said textured release-treated paper surface comprises a surface creped to contraction of 10 to 15 percent.

8. The method according to claim 5 wherein said textured release-treated paper surface comprises a surface textured to simulate woodgrain.

9. The method according to claim 5 wherein said support sheet is chosen from the group consisting of card stock, chip board and cardboard.

10. The method according to claim 5 wherein said release-treated paper surface comprises a silicone coating.

11. The method according to claim 5 wherein said release-treated paper surface comprises a coating of dimethylpolysiloxane.

12. The method according to claim 5 wherein said release-treated paper surface comprises a layer of polyolefin coated with a silicone coating.

13. The method according to claim 5 wherein said release-treated paper surface comprises a layer of polyethylene coated with a silicone coating.

14. The method according to claim 5 wherein said release-treated paper surface comprises a release-treated surface of a paper selected from the group consisting of glassine, highly calandered Kraft paper, and clay-filled, highly calandered Kraft paper.

15. The method according to claim 5 including the subsequent step of reusing said layered structure in a subsequent similar molding process.

16. The method according to claim 1 including the subsequent step of reusing said layered structure in a subsequent similar molding process.

* * * * *